United States Patent [19]
Pickett

[11] Patent Number: 5,763,014
[45] Date of Patent: Jun. 9, 1998

[54] LIQUID APPLIED WATERPROOFING

[75] Inventor: Matthew T. Pickett, Cambridge, Mass.

[73] Assignee: W. R. Grace & Co.-Conn., New York, N.Y.

[21] Appl. No.: 773,814

[22] Filed: Dec. 19, 1996

[30] Foreign Application Priority Data

Jan. 4, 1996 [GB] United Kingdom ............. 9600077

[51] Int. Cl.$^6$ ................. B05D 1/28; C08C 19/00
[52] U.S. Cl. .............. 427/430.1; 427/302; 427/413; 427/443.2; 427/445; 523/351; 524/475; 524/575.5; 525/332.5; 525/332.6
[58] Field of Search ............... 427/302, 413, 427/429, 430.1, 443.2, 445; 524/475, 575.5; 523/351; 525/332.5, 332.6

[56] References Cited

U.S. PATENT DOCUMENTS

| | | | |
|---|---|---|---|
| 4,248,926 | 2/1981 | Tajima et al. | 428/253 |
| 4,249,950 | 2/1981 | Hurst | 106/90 |
| 4,287,242 | 9/1981 | Monden et al. | 427/426 |
| 4,362,841 | 12/1982 | Minatono et al. | 524/531 |
| 4,554,313 | 11/1985 | Hagenbach et al. | 525/54.5 |
| 4,567,222 | 1/1986 | Hagenbach et al. | 524/476 |
| 4,609,696 | 9/1986 | Wilkes | 524/59 |
| 4,657,595 | 4/1987 | Russell | 106/277 |
| 4,745,155 | 5/1988 | Grossi | 525/54.5 |
| 4,784,780 | 11/1988 | Harriett | 405/270 |
| 4,872,932 | 10/1989 | Yoshikawa et al. | 156/151 |
| 4,992,334 | 2/1991 | Kindt et al. | 428/489 |
| 5,078,905 | 1/1992 | Trinh et al. | 252/182.17 |
| 5,091,447 | 2/1992 | Lomasney | 523/408 |
| 5,104,916 | 4/1992 | Trinh et al. | 524/71 |
| 5,130,182 | 7/1992 | Aoshima et al. | 428/212 |
| 5,159,980 | 11/1992 | Onan et al. | 166/294 |
| 5,382,612 | 1/1995 | Chaverot et al. | 524/420 |
| 5,565,511 | 10/1996 | Braud et al. | 524/570 |
| 5,578,800 | 11/1996 | Kijima | 181/171 |

FOREIGN PATENT DOCUMENTS

| | | |
|---|---|---|
| 0 248 162 | 12/1987 | European Pat. Off. ......... C08J 9/08 |
| 0645432A1 | 3/1995 | European Pat. Off. . |
| 57-5774 | 1/1982 | Japan . |
| 2023124 | 12/1979 | United Kingdom . |
| 2205104 | 11/1988 | United Kingdom . |

OTHER PUBLICATIONS

"Servidek™ Bridge Deck Waterproofing" publication date, Dec. 1992.

*Primary Examiner*—Shrive Beck
*Assistant Examiner*—Michael Barr
*Attorney, Agent, or Firm*—Craig K. Leon; William L. Baker

[57] ABSTRACT

A liquid applied waterproofing formulation system comprises separate formulation components A and B which are transportable to the application site in separate containers but combinable at the site to form a blend, preferably a water-in-oil blend, which solidifies into a continuous membrane having hydrostatic head resistance. Component A is an aqueous latex of a natural or synthetic rubber. Component B is an oil carrier in which is dispersed a vulcanizing agent operative to cure the rubber and a hygroscopic agent operative to chemically bind the water in component A. Methods for waterproofing, which employ the formulation system, are also disclosed.

20 Claims, 1 Drawing Sheet

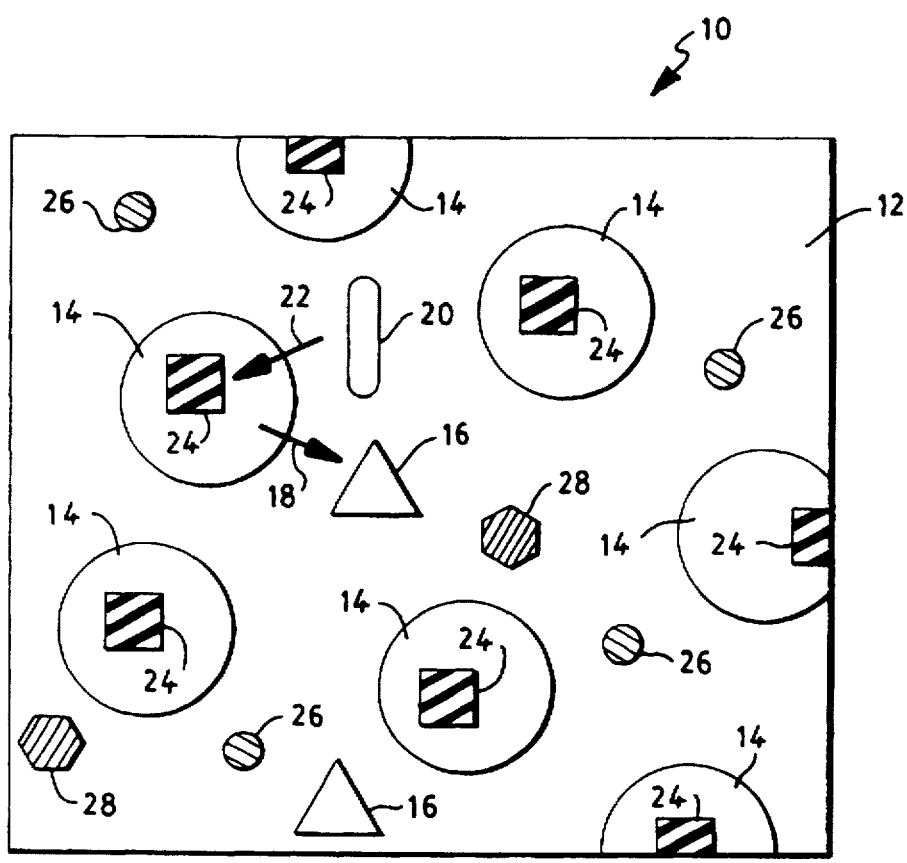

LIQUID APPLIED WATERPROOFING

FIELD OF THE INVENTION

This invention relates to a formulation and method for waterproofing or dampproofing a substrate surface, such as a horizontal concrete deck or vertical foundation wall, using a two-component waterproofing formulation system which is applied in liquid form after blending at the application site and which solidifies into a continuous membrane.

BACKGROUND OF THE INVENTION

Building constructions and other civil engineering projects, such as roads, bridges, foundations, tunnels, roof decks, and plaza decks, are susceptible to water penetration resulting, in part, from their inherent properties. Liquid composition coatings have been employed in the past for minimizing penetration by water and moisture. For example, hot bitumen or tar coatings have been used, but unpleasant odors are emitted when the coating mixture is heated at the site. It is also known to use urethane-based systems but this, too, is undesirable from a similar standpoint.

German patent 299438 of Gladitz et al. disclosed a bitumen-latex emulsion produced by heating the bitumen to 105°–115° C., heating an aqueous component containing oleic acid, potassium hydroxide, and ethoxylated alkyphenol to 90°–95° C., and then mixing the bitumen with the aqueous component. Once cooled to room temperature, 77–83 parts of the emulsion obtained were mixed with a rubber latex, followed by mixing in a vulcanization accelerator. This was followed by mixing in a dry mixture of sulphur, zinc oxide, bentonite, and 2-mercaptobenzothiazole. The resultant composition was said to be useful for repairing defective roofs and as a protective paint.

For the past two decades, W. R. Grace of Slough, Great Britain, has sold an adhesive formulation under the tradename SERVIDEK for use as an adhesive to adhere a laminate onto a concrete bridgedeck. This adhesive involves a rubber latex which is mixed on site with a bitumen in oil mixture containing lime as a dessicant. The adhesive alone, however, is not effective for, nor is it sold alone for the purpose of, providing a waterproofing barrier coating.

British application 2 205 104 A of Semsei et al. disclosed a "cold usable, permanently plastic product of controllable setting time," which consisted of components A and B, and was free of water and organic solvent. Component A contained 40–60% wt. bitumen or bitumen modified with polystyrene-polybutadiene polymer, and further containing 20–40% wt. liquid oleic acid, 20–40% wt. filler, and 0–10% wt. solid sulfur factice (vulcanized oil). Component B contained 0–20% wt. liquid factice, made from drying or semidrying vegetable oil and sulfur, 10–20% wt. zinc or magnesium oxide, alkali-earth metal oxide or -hydroxide, chlorinated lime or mixture thereof, and 60–80% wt. filler such as ground quartz or sand.

In U.S. Pat. No. 5,382,612 of Chaverot et al., there was disclosed a process for preparing an aqueous emulsion comprising a bitumen/polymer binder. The emulsion comprised a sulphur-donating curing agent for cross-linking the polymer into a three-dimensional structure.

European patent application No. 0 645 432 A1 of Obayashi disclosed a rubber modified asphalt waterproofing composition obtained by spraying a cationic rubber modified asphalt emulsion and an organic coagulating agent substantially at the same time. The organic coagulating agent includes an aqueous solution containing an alkyl sulfonate polymer resin. Obayashi taught that a variety of cement materials can be used to hydrate with water in the cationic rubber modified asphalt emulsion to absorb the water as crystal water, and thus reduce the amount of water exuding from the formed waterproofing layer.

A number of commercial products exist which employ multi-component water-based systems. For example, neoprene latexes are mixed with asphalt emulsions. Thereafter, a salt can be stirred into the mixture to coagulate the emulsion. The salt coagulant may also be co-sprayed with the emulsion onto the building surface, or the salt may be replaced or augmented by using cement as a dessicant. It is believed, however, that the combination of physical strength—tensile, compressive, and shear strength—of the latex rubber/bitumen emulsion systems are generally insufficient to provide resistance to hydrostatic pressure, crack bridging, and crack cycling, unless a high coating thickness is applied or a reinforcing layer is set into the coating. In conditions of high humidity or where the substrate is wet or damp, the rate of hardening is slow, resulting in a soft coating prone to damage for several days after application.

In conceiving the liquid applied waterproofing formulation system of the present invention, therefore, the inventors perceived six specific, sometimes conflicting, problems. The first was to avoid complex mixing steps at the application site. Prior art emulsions required mixing of the latex rubber and bitumen emulsions, followed by mixing in powdered coagulants, dessicants, or curatives. This was inconvenient; the measurement of powdered mix-ins was susceptible to the winds of error. The second problem was achieving "pot-life" and "workability" which meant, respectively, that the mixture needed sufficient time and viscosity for convenient application as a liquid coating before the onset of solidification rendered application difficult, or even impossible. The third problem was to attain a rheological character permitting the mixture to be trowel-applied during the workable pot-life to a vertical surface such as a foundation wall to obtain the desired thickness within one coating. Avoiding subsequent coatings meant decreasing time, labor, and expense at the job site. The fourth problem was to have a mixture that cured within a reasonable time after coating. The fifth problem was to avoid a "skin" effect that was prevalent in polyurethane coatings, whereby the outermost surface would harden but be vulnerable to gases bubbling through and creating a "pinhole" and thus defeating the ability of the coating to act as a continuous water/moisture barrier. Finally, the sixth problem was to obtain sufficient tensile, compressive, and shear strength, once the membrane cured, to withstand the hydrostatic pressures of subgrade environments. In view of the foregoing dynamic and conflicting problems, a new liquid applied waterproofing formulation system and method are needed.

SUMMARY OF THE INVENTION

In surmounting the disadvantages of the prior art, the present invention provides a novel two-component liquid applied waterproofing formulation system and method that simultaneously provide convenient mixing at the application site, a workability and potlife that permit convenient application, the ability to obtain a rheology for trowelling the formulation in sufficient coverage thicknesses, a reasonable curing time, and hydrostatic pressure resistance when solidified into a membrane.

The present invention also has the advantage, primarily when compared with polyurethane-based systems, in that the coating formulation contains substantially no volatile organic compounds. Another advantage is that the blended formulation does not require any solvent of any kind, nor does it require humidity in the air for curing. Consequently, there is little or no shrinkage in the formulation as it cures and hardens, such that the wet thickness is substantially the same as the dry thickness.

An exemplary two-component liquid applied waterproofing formulation system of the present invention comprises: components A and B which are transportable to the application site in separate containers but combinable at the site to form a blend in which a vulcanizing reaction is initiated for solidifying the components into a membrane; component A thereof comprising an aqueous latex of a natural or synthetic rubber; and component B thereof comprising an oil carrier in which is dispersed a vulcanizing agent operative to cure the component A rubber, and a hygroscopic agent operative to chemically bind the water of component A. Preferred formulation systems comprise a water-in-oil blend wherein the oil-carried hygroscopic agent chemically binds with water in component A, and the rubber of component A is cured by the vulcanizing agent of component B.

Exemplary methods of the present invention comprise providing components A and B in separate containers, component A comprising an aqueous latex of a natural or synthetic rubber, and component B thereof comprising an oil carrier in which is dispersed a vulcanizing agent operative to cure the component A rubber, and a hygroscopic agent operative to chemically bind the water of component A. Other exemplary methods comprise mixing together components A and B to form a water-in-oil blend; applying the mixture onto a substrate surface; and allowing the mixture coating to solidify into a membrane. Exemplary substrate surfaces include horizontal decks or vertical walls such as foundation walls. Other exemplary surfaces include tunnel walls.

BRIEF DESCRIPTION OF DRAWING

The following detailed description of the invention may be more readily comprehended when considered with the accompanying drawing, wherein the FIGURE which is a diagram of exemplary components A and B of the present invention after intermixing to form a water-in-oil blend.

Components A and B may be sold and transported to the application site in separate containers, such as in cans or buckets, as a "package" in that they have been premeasured so that they can be combined at the site without measuring. The "package" can also comprise taping or tying the containers together or placing them within a box carton and selling them as an integral unit. In preferred embodiments of the invention, the component A may be contained within a smaller container, such as a plastic bag, and located within a larger container that also contains component B. At the site, the larger container is opened, the plastic bag can then be accessed and opened to permit component A to be released and mixed into component B within the larger container. As components A and B are ideally sold together in premeasured quantities, the preparation of the formulation system at the application site can thus be performed conveniently and with a minimal chance for error.

DETAILED DESCRIPTION OF THE INVENTION

FIG. 1 provides an illustration of the reaction dynamics that are postulated to occur when components A and B are combined at the application site to form a water-in-oil blend. At least three dynamic processes or stages occur. First, the oil carrier 12 of component B provides a continuous phase in which the aqueous phase of component A (represented by circles as at 14) is dispersed as a discontinuous phase. The rubber (represented by the squares as at 24) is swelled (as designated at 22) during the mixing process by the oil 12. This swelling occurs within approximately 1 to 3 minutes after the beginning of mixing. This begins a viscosity-increasing process whereby the emulsified rubber particles transferred from the aqueous droplets into the oil-carrier start to form a rubbery network. During this first stage, and during the application stage (as will be immediately described), the aqueous phase 14 acts as a lubricant or plasticizer to facilitate mixing and dispersion of both components A and B.

In the second stage, the hygroscopic agent 16 in component B chemically binds with the water molecules of component A (as designated at 18). This begins a second stage viscosity-increasing process during which the formulation begins to turn into a soft, solid pliable mass, as water is removed from the system through chemical combination with the hygroscopic agent. The time window for this "second stage" process, in which the formulation is workable (i.e., can be applied onto a horizontal or vertical surface using a trowel or brush, for example) is up to about 1 to 2 hours after the beginning of mixing, depending upon ambient temperature. The term "trowel" as used herein shall mean and refer to the use of an implement, preferably one which is hand-manipulatable, for conveying a workable pliant mass of the mixed components A and B to a substrate surface and for spreading the mass into a coating having a desired thickness. It is also contemplated that brushes, spatulas, or other hand held implements may also be used to coat-apply the formulations of the invention. It is also contemplated that components A and B can be co-sprayed onto a surface using known techniques.

In the third stage, the oil-swelled rubber 24/12 of component A is cured by the vulcanizing agent(s) 20 of component B. Hardening of the rubber into an elastic solid through the vulcanization process is essentially complete about 1 to 3 days or more thereafter at 23° C., and could take longer at lower temperatures.

An optional colorant, pigment, opacifier, or color modifier, such as carbon black 26, and an exemplary rheology modifier, such as montmorillonite clay 28, are also illustrated in the continuous oil phase 12.

The rubber latex of component A may comprise a known rubber or rubbers. Preferably, component A comprises a styrene butadiene (SBR) latex that is between 5–50% by weight total, and more preferably 10–25% by weight total (based on total dry solids in combined components A and B). SBR latexes are commercially available. The term "rubber" is used herein to mean hydrocarbon polymers occurring naturally, such as natural rubber from trees, or synthetic hydrocarbon polymers having properties of elongation or yield under stress, and elastic recovery after vulcanization with sulphur or other crosslinking agents. Although an SBR latex is preferred, other possibilities are natural rubber (cis-1,4-polyisoprene), styrene butadiene styrene (SBS), butyl rubber, neoprene, nitrite rubber, acrylate, and the like. Known emulsifying or latex stabilizing agents are believed to be suitable for use in the invention.

Component A preferably comprises a latex stabilizer operative to increase the working life of the latex by controlling the initial pH of the latex components. It is also discovered that additions of potassium hydroxide (KOH) dissolved in minimal amounts in component A can lengthen the setting time, but excessive amounts may destabilize and cause premature gelation of the latex. A preferred addition rate, therefore, is up to 1.5 parts per 100 parts of rubber. It is believed that other high pH additives, such as ammonia or sodium hydroxide (NaOH) may be used. Accordingly, an exemplary component A of the invention may comprise 0 to 2.5 phr (per hundred parts rubber).

Component B contains, among other things, an oil 12 carrier fluid for the vulcanization agent and hygroscopic agent. In preferred embodiments, the oil carrier fluid is a blend of hydrocarbon oils, such as a blend of both aromatic and paraffinic compositions. The aromatic oils which preferentially swell the rubber particles are generally more viscous. Fluidity can be controlled by the addition of paraffinic oils of lower viscosity which also serve to adjust the setting time of the composition. In other exemplary embodiments, synthetic liquid plasticisers such as phthalates, adipates, or other commonly used rubber plasticisers can be used. The carrier fluid 12 may also contain a proportion of bitumen, either oxidized or penetration grade. The level of aromatic oil is not likely to be less than 50% of the oil carrier fluid, and the bitumen not greater than 30%. The presence of the bitumen, however, is not critical to the invention. Also optional is the use of a hard synthetic or natural resin. The oil 12 carrier fluid will comprise 20–60% by total weight of the formulation (when components A and B are combined).

Component B contains a vulcanization agent or package 20. Preferably, the vulcanization package comprises elemental sulphur as the sulphur donor for the system, zinc oxide as a vulcanization activator, and a mixture of zinc iso-propyl xanthate (ZIX) and zinc dibutyl dithiocarbamate dibutylamine complex (ZDBCX) as accelerators. These may be used in the preferred ranges, respectively, 0.5 to 15.0 (phr parts sulphur based on parts hundred of rubber), 0.5 to 20.0 phr (ZnO), 0.1 to 5.0 phr (ZIX), and 0.1 to 5.0 phr (ZDBCX). Other known vulcanizing agents and/or packages are believed to be suitable for use in the invention. See e.g., U.S. Pat. No. 5,159,980, assigned to Halliburton, incorporated herein by reference.

Component B also contains a hygroscopic agent or dessicant for chemically binding the water of component A. The preferred hygroscopic agent is calcium oxide. Other hygroscopic agents may include other metal oxides which react with water to form hydroxides, e.g., magnesium, barium, etc. Hydraulic cements, such as Portland cement, or high alumina cement, calcium sulphate cement (plaster of paris), or magnesium oxychloride cement, may also be used. The hygroscopic agent may also comprise anhydrous salts which absorb significant proportions (25% or more) of their own weight of water, such as borax. The weight of the hygroscopic agent is chosen to effectively dewater the latex, with preferably a slight excess to ensure that the water is bound up. However, it is possible that partial desiccation of the latex may be used, ie., less than stoichiometric quantities of hygroscopic agent used. The hygroscopic agent, depending upon which is chosen, can comprise 10–50% of the total formulation system.

Component B may also comprise one or more rheology modifiers. Preferably, a combination of montmorillonite clay (activated with a chemical activator) and stearate-coated calcium carbonate is used to achieve the desired balance of rheological properties, although other options, such as organo-treated bentonite clays, fumed silica, polymer fibers, ground rubber, pulverized fly ash, hollow glass microspheres, and hydrogenated castor oils, could be employed. The amount of rheology modifiers, depending upon the material chosen, could comprise 0.5 to 25.0% weight total solids in the formulation system (components A and B combined).

Optionally, but preferably, a colorant, color modifier, opacifier, or pigment, such as carbon black, can be contained in component B in the amount of 0.1–10.0% weight total. Other known pigments or dyes can be used. Exemplary formulation systems of the invention comprise a colorant in the oil-carrier phase, such as carbon black, to act as a visual aid in the mixing together of components A and B. When A and B are initially mixed together, the mixture is milky or light grey in color, but then assumes the color of the pigment as water droplets which initially contained the rubber become dispersed in oil, and the formulation thereafter converts to the color of the pigment carried in the continuous oil phase. The final conversion to the color of the pigment, such as the black of the carbon black, provides a good visible indication that the system has been properly mixed and set up, and that the three dynamic stage or processes, discussed above, will proceed. The final conversion to the color of the pigment also provides an indication that the first stage is complete, and that the second stage has begun wherein the formulation system is workable and can be trowel-applied to a surface.

Further exemplary formulation systems of the invention comprise a colorant in one of either components A or B, and preferably only in component B, as a visual mixing aid.

Preferred waterproofing formulation systems of the invention, when components A and B are mixed, applied to a building surface, and allowed to cure into a solid membrane, have at least a 10 psi hydrostatic head resistance at 1.5 mm thickness in accordance with ASTM D 5385-93. More preferably, the hydrostatic head resistance at 1.5 mm is at least 15 psi, and most preferably it is at least 30 psi (ASTM D 5385-93).

The following examples are provided by way of illustration only and are not intended limit the scope of the invention.

EXAMPLE 1

A formulation system was prepared wherein components A and B had the following components based on total dry weight solids of the total mix (total solids when A and B are combined). Component A: styrene butadiene (20–25%), and potassium hydroxide (0.25–0.5%). Component B: aromatic process oil (10–15%), paraffinic oil (10–15%), clay (0.25–1.0%), CaCO$_3$ (6.0–7%), CaO (20–30%), carbon black (0.25–1.0%), sulfur (0.25–1.5%), zinc oxide (0.5–2.0%), zinc isopropyl xanthate (0.25–1.0%), and zinc dibutyl dithiocarbamate dibutylamine complex (0.25–1.0%).

Component A is milky (white) colored, and is poured into component B, which is initially black in color. Upon initially mixing, component A turns the entire mixture a milky color, and then the color of the mixture reverts, upon further mixing, to a uniform dark or black color, signifying that the mixture is ready for application as coating. The components should be delicately and slowly mixed. Caution should be taken to avoid over-mixing and vigorous mixing because the hardening process could proceed too quickly. A hand trowel was used to apply the formulation mixture, which should have a thixotropic property sufficient for application to a horizontal or vertical wall surface. A coating thickness of approximately 1–3 mm was achieved.

EXAMPLE 2

Another formulation system was prepared wherein the components A and B had the following components based on total dry weight solids of the total mix (total solids when A and B are combined); as follows. Component A: styrene butadiene (15–20%), natural rubber (5–10%), and potassium hydroxide (0.5–1.0%). Component B: oxidised bitumen (5–10%), aromatic process oil (15–25%), paraffinic oil (10–15%), clay (1.0–2.0%), CaO (25–35%), sulphur (1.0–2.0%), zinc oxide (0.5–2.0%), zinc isopropyl xanthate (0.5–1.0%), and zinc diethyl dithio carbamate (0.5–1.0%). This formulation was mixed and applied similar to Example 1.

EXAMPLE 3

Another formulation system was prepared wherein the components A and B had the following components based on total dry weight solids of the total mix (total solids when A and B are combined), as follows. Component A: styrene butadiene (20–25%), and potassium hydroxide (0.25–0.5%). Component B: oxidised bitumen (5–10%), aromatic process oil (15–25%), paraffinic oil (10–15%), clay (1.0–2.0%), CaO (25–35%), sulphur (0.5–1.5%), zinc oxide (0.5–2.0%), 2,2-dithio bisbenzthiazole (0.5–1.0%), and tetramethyl thiuram disulphide (0.1–0.5%). This formulation was mixed and applied similar to Example 1.

EXAMPLE 4

A test method was used for evaluating hydrostatic head resistance, is which is a measure of the ability of the waterproofing membrane to resist rupture or penetration of water under pressure. Such an ability is particularly desirable below ground. Waterproofing membranes made by Examples 1–3 above were subjected to the standard test method described in ASTM D 5385-93 (Test Method for Hydrostatic Pressure Resistance of Waterproofing Membranes). The method involves the application of the membrane to a concrete test block and allowing it to cure. The block is then cracked longitudinally (at a pre-formed groove) and the crack opened by 1/8 inch. The block is clamped in a test rig and water pressure is applied and held for 1 hour at incremental increases in pressure until the membrane fails, e.g., the test rig leaks. The hydrostatic head resistance is the highest pressure the membrane will withstand for 1 hour without leaking.

Comparison hydrostatic pressure resistance tests where performed on control formulations that were made using two component combinations. For example, a rubber latex/bitumen emulsion mixture which did not have a vulcanizing agent contained within an oil carrier, was tested and exhibited zero (0.0) hydrostatic head resistance when tested under ASTM D 5385-93. In another example, a rubber latex and oil-lime suspension was also tested, and exhibited zero (0.0) hydrostatic head resistance.

Conversely, when the formulation systems of Examples 1–3 were tested, the samples demonstrated at least 15 psi and in one case up to 45 psi hydrostatic head resistance at 1.5 mm thickness (ASTM D 5385 93).

EXAMPLE 5

Another formulation system was prepared wherein the components A and B had the following components based on total dry weight solids of the total mix (total solids when A and B are combined), as follows. Component A: styrene butadiene (15–20%), natural rubber (5–10%), and potassium hydroxide (0.5–1.0%). Component B: oxidised bitumen (5–10%), aromatic process oil (15–25%), paraffinic oil (10–15%), clay (1.0–2.0%), regular portland cement (35–45%), sulphur (1.0–2.0%), zinc oxide (0.5–2.0%), zinc oxide (0.5–2.0%), and zinc isopropyl xanthate (0.5–1.0%). Tis formulation was mixed and applied similar to Example 1.

The foregoing discussion and examples are provided for illustrative purposes only and are not intended to limit the scope of the invention.

It is claimed:

1. A two-component liquid applied waterproofing formulation system for application as a liquid to a building construction surface or other civil engineering surface, comprising: components A and B which are transportable to the application site in separate containers but combinable at the site to form a blend in which a vulcanizing reaction is initiated for solidifying the components into a waterproofing membrane; component A thereof comprising an aqueous latex of a natural or synthetic rubber; and component B thereof comprising an oil carrier in which is dispersed a vulcanizing agent operative to cure the component A rubber, and component B further comprising a hygroscopic agent operative to chemically bind the water in component A; said component A and B being provided such that when intermixed a water-in-oil blend is obtained wherein said oil carrier containing said hygroscopic agent and vulcanizing agent provides a continuous phase in which an aqueous phase of component A containing said rubber is dispersed as a discontinuous phase, the respective locations of said hygroscopic agent, vulcanizing agent, and rubber thereby providing a reaction dynamic wherein said rubber becomes swelled by said oil and said hygroscopic agent chemically binds water in the latex discontinuous aqueous phase and thereby effectuates increasing viscosity of said intermixed components and enables said vulcanizing agent and rubber to be introduced to each other such that curing can be achieved at a time later than said viscosity increasing effectuation, whereby pot-life and workability of the intermixed components at the job site are obtained.

2. The waterproofing formulation system of claim 1 wherein component B comprises an aromatic process oil and a paraffinic oil, and said components A and B, when mixed together, initially form a water-in-oil blend.

3. The waterproofing formulation system of claim 2 wherein the oil-carried hygroscopic agent comprises calcium oxide.

4. The waterproofing formulation system of claim 1 wherein said hygroscopic agent comprises a metal oxide, hydraulic cement, anhydrous salt, or a mixture thereof.

5. The waterproofing formulation system of claim 3 wherein said vulcanizing agent comprises sulfur or a derivative thereof.

6. The waterproofing formulation system of claim 1 wherein component A and B are contained in separate containers.

7. The waterproofing formulation system of claim 1 wherein component A is contained within a first container that is located within a second container which contains component B.

8. The waterproofing formulation system of claim 1 wherein component A further comprises a rheological modifier comprising a clay, fumed silica, polymer fibers, ground rubber, pulverized fly ash, hollow glass microspheres, or hydrogenated castor oils.

9. The waterproofing formulation system of claim 1 wherein component A comprises montmorillonite clay and calcium carbonate.

10. The waterproofing formulation system of claim 1, wherein component B further comprises a colorant, color modifier, opacifier, or pigment operative to act as a visual aid in mixing together said component A and B.

11. The waterproofing formulation system of claim 1 further comprising a bitumen.

12. The waterproofing formulation system of claim 1 wherein the substrate surface is a horizontal deck or vertical building surface.

13. The waterproofing formulation system of claim 1 wherein, after components A and B are mixed and applied as a coating to form a waterproofing membrane which is allowed to cure, the cured membrane has a resistance to hydrostatic pressure of at least 10 psi in accordance with ASTM D5385-93.

14. The waterproofing formulation system of claim 1 wherein components A and B, when mixed together, and applied as a coating, have substantially identical wet and dry thicknesses.

15. The waterproofing formulation system of claim 1 wherein components A and B, when mixed together, and applied as a coating, emit substantially no volatile organic chemicals.

16. A method for waterproofing building construction surface or other civil engineering surface using a two component formulation system, comprising: providing components A and B in separate containers, component A comprising an aqueous latex of a natural or synthetic rubber, and component B thereof comprising an oil carrier in which is dispersed a vulcanizing agent operative to cure the component A rubber, and component B further comprising a hygroscopic agent operative to de-water the aqueous phase of component A; said component A and B being provided such that when intermixed a water-in-oil blend is obtained wherein said oil carrier containing said hygroscopic agent and vulcanizing agent provides a continuous phase in which an aqueous phase of component A containing said rubber is dispersed as a discontinuous phase, the respective locations of said hygroscopic agent, vulcanizing agent, and rubber thereby providing a reaction dynamic wherein said rubber becomes swelled by said oil and said hygroscopic agent chemically binds water in the latex discontinuous aqueous phase and thereby effectuates increasing viscosity of said intermixed components and enables said vulcanizing agent and rubber to be introduced to each other such that curing can be achieved at a time later than said viscosity increasing effectuation, whereby pot-life and workability of the intermixed components at the job site are obtained.

17. The method of claim 16 further comprising combining and mixing said components A and B to provide a water-in-oil blend.

18. The method of claim 16 comprising the step of trowel-applying said mixed components to wet coat a building surface, and allowing the mixture coating to solidify into a membrane.

19. The method of claim 16 wherein said building surface is a horizontal surface.

20. The method of claim 16 wherein said building surface is a vertical surface.

* * * * *